(12) United States Patent
Nallagatla et al.

(10) Patent No.: US 7,747,848 B1
(45) Date of Patent: Jun. 29, 2010

(54) UPDATING THE SYSTEM MANAGEMENT INFORMATION OF A COMPUTER SYSTEM

(75) Inventors: Purandhar Nallagatla, Duluth, GA (US); Hari Krishna Doppalapudi, Chennai (IN); Mark Eric Wilson, Tucker, GA (US)

(73) Assignee: American Megatrends, Inc., Norcross, GA (US)

( * ) Notice: Subject to any disclaimer, the term of this patent is extended or adjusted under 35 U.S.C. 154(b) by 935 days.

(21) Appl. No.: 11/496,126

(22) Filed: Jul. 31, 2006

(51) Int. Cl.
*G06F 9/00* (2006.01)
*G06F 15/177* (2006.01)
*G06F 9/24* (2006.01)
*G06F 9/44* (2006.01)

(52) U.S. Cl. ............... 713/2; 713/1; 713/100; 717/168

(58) Field of Classification Search ............ 713/1, 713/2, 100; 717/168
See application file for complete search history.

(56) References Cited

U.S. PATENT DOCUMENTS

| | | | | |
|---|---|---|---|---|
| 6,122,732 | A * | 9/2000 | Ahuja | 713/1 |
| 6,952,702 | B2 * | 10/2005 | Burrell | 707/101 |
| 7,257,705 | B2 * | 8/2007 | Flam et al. | 713/100 |
| 7,418,590 | B2 * | 8/2008 | Azzarito et al. | 713/2 |
| 7,475,235 | B1 * | 1/2009 | Bernardy et al. | 713/1 |
| 2004/0123090 | A1 * | 6/2004 | Zimmer et al. | 713/1 |
| 2004/0268106 | A1 * | 12/2004 | Holmberg et al. | 713/1 |
| 2006/0224874 | A1 * | 10/2006 | Lu et al. | 713/1 |

OTHER PUBLICATIONS

Specification entitled, "DMTF Specification DSP0134, System Management BIOS Reference Specification", dated Jan. 20, 2003, pp. 1-93, Version 2.3.4.

* cited by examiner

*Primary Examiner*—Ji H Bae
(74) *Attorney, Agent, or Firm*—Hope Baldauff Hartman

(57) ABSTRACT

A method, system, apparatus, and computer-readable medium for updating the management information of a computer system are provided. According to one method, a system management information table is built during the execution of the computer system. The system management information table is built from a base set of management information and one or more updates to the base set of management information. The updates to the base set of management information may be stored a protected region of a non-volatile memory device. A utility program is provided for storing the updates to the management information in the non-volatile memory device.

18 Claims, 8 Drawing Sheets

UPDATING THE SYSTEM MANAGEMENT INFORMATION OF A COMPUTER SYSTEM

BACKGROUND

Computing systems often utilize firmware that is stored in a non-volatile memory device, such as a read-only memory ("ROM") device or a non-volatile random access memory ("NVRAM") device. The firmware provides program code for performing power-on self tests, booting, and for providing support to the operating system and other functions. When computer systems are designed, there are many different combinations of hardware devices that may be present in the computer system or on a computer system motherboard. To support such a wide variety of hardware combinations, the motherboard manufacturers often provide original equipment manufacturers ("OEMs") with a reference board and corresponding firmware image that represents the most common motherboard chipset configuration.

The reference board provides an OEM with a proof of concept that the OEM will then customize according to their requirements. The OEM may add, remove, or interchange hardware components to and from the reference board according to desired hardware configurations. As various hardware components are added or removed from a computer system motherboard, the firmware image must be updated to reflect the configuration change in order for the modified chipset configuration to properly function. The OEM must then request a firmware image that corresponds to the specific components of the customized motherboard. The customized firmware image is created and provided to the OEM for flashing into a memory device and distribution with the OEM's customized motherboard.

The firmware customization process often includes the modification of management data that is contained within the firmware for the customized system board. In particular, computing systems often utilize a firmware that is compatible with the system management basic input/output system ("SMBIOS") specification. The SMBIOS specification addresses how motherboard and system vendors present management information about their products in a standard format. The information is intended to allow generic instrumentation to deliver this information to management applications, thereby eliminating the need for error prone operations like probing system hardware for presence detection.

In order to provide the correct management information for the customized board, management data contained within the firmware must be modified. This is typically not a process that is performed by the OEM. As a result, the firmware manufacturer must customize the SMBIOS data contained in the firmware for the OEM. This process consumes time and resources as the firmware image is created by a manufacturer, delivered to an OEM, returned to the manufacturer for customization, and so on.

It is with respect to these considerations and others that the various embodiments described below have been made.

SUMMARY

In accordance with the embodiments and implementations described herein, a method, system, apparatus, and computer-readable medium for updating the system management information of a computer system at runtime are provided. Through the embodiments described herein, an OEM can update the management information contained in a firmware without the assistance of the firmware manufacturer. The updates provided by the OEM and stored in the system firmware are then utilized during the execution of the computer system.

According to one aspect, a method is provided for updating the system management data of a computer system. According to the method, a system management information table is built during the execution of the computer system. The system management information table is built from a base set of management information and one or more updates to the base set of management information. In particular, the system management information table may be built using the base set of management information and the updates may be utilized to overwrite particular entries in the table. Alternatively, the system management information table may be built using information contained in both the base set of management information and the updates to the set of management information. According to one implementation, the management information table comprises a SMBIOS structure table compatible with the SMBIOS specification.

According to one aspect of the method, the base set of management information may be stored in a non-volatile memory device, such as an NVRAM. The updates to the base set of management information may also be stored in the non-volatile memory device. In one embodiment, the updates are stored in a protected boot block region of the non-volatile memory device. The updates to the management information may be read from the non-volatile memory device utilizing a system management interrupt ("SMI").

According to another aspect of the method, a utility program is provided for storing the updates to the management information in the non-volatile memory device. In particular, the utility program is operative to receive the updates to the management information. The utility then stores the updates to the management information in the protected boot block of the non-volatile memory device. A SMI may be utilized by the utility program for reading the updates from the non-volatile memory device and for writing the updates to the non-volatile memory device. The utility program may be utilized, for instance, by an OEM to store updated management information in the firmware prior to shipping. At execution time, the updated management information is utilized by the computer system.

According to another aspect of the invention, a memory is provided for storing data for updating the management information of a computer system at runtime. The memory includes a management information update data structure stored in the memory. The management information update data structure includes a globally unique identifier ("GUID") field for storing data that uniquely identifies the data structure. The data structure also includes a data area for storing the data for updating the management information of the computer system at runtime. The data structure also includes a length field for storing data identifying the length of the data field.

The data area of the management information update data structure includes a first data field for storing data identifying a table type within a system management information table. The data area also includes a second data field for storing data identifying an offset within the table type identified by the data stored in the first field. The data area also includes a third field for storing data for updating the contents of the system management information table at the location specified by the data stored in the first data field and the second data field. The system management information table may be an SMBIOS structure table.

The subject matter described herein may also be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings.

DETAILED DESCRIPTION

Figure 1:
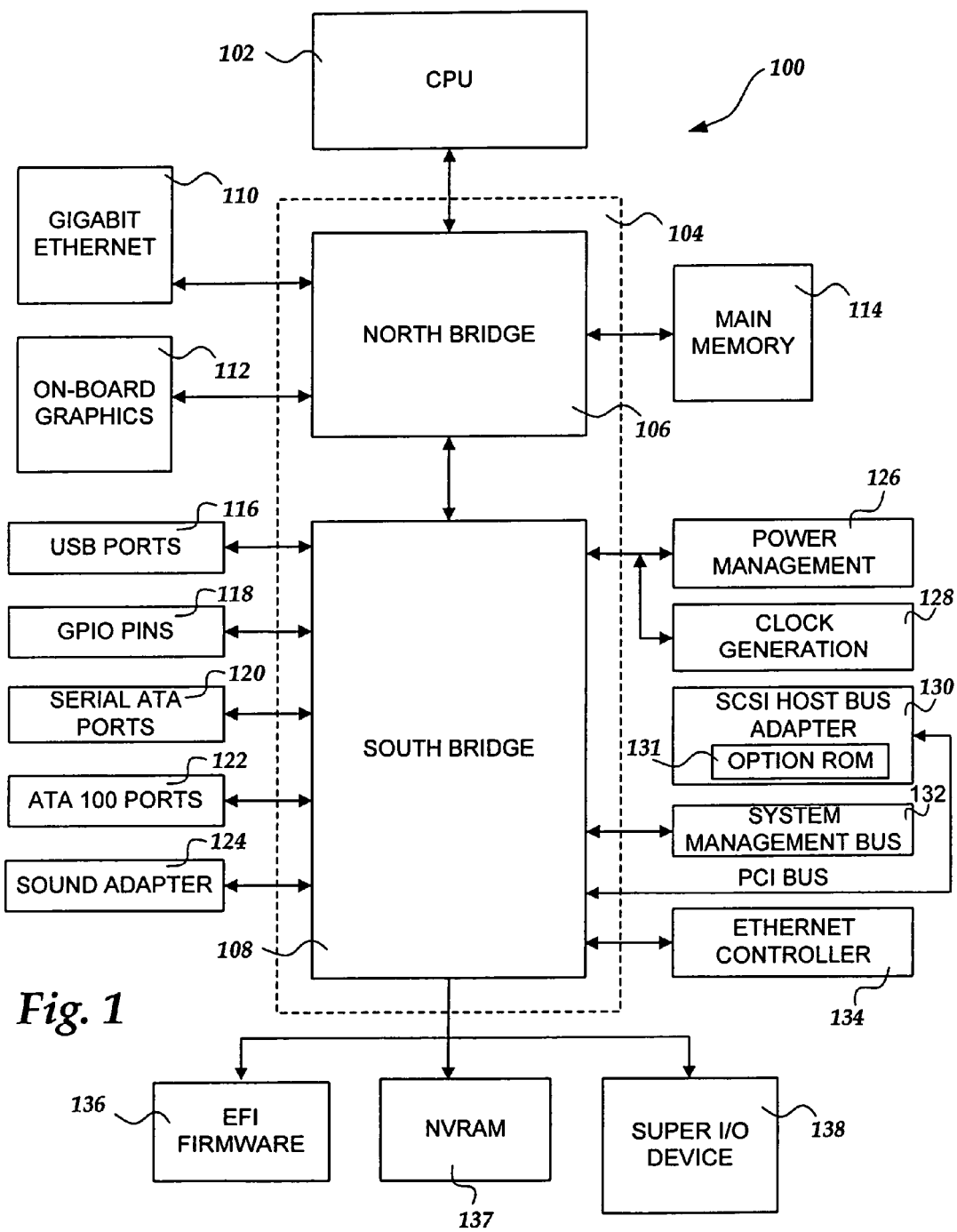
FIG. 1 is a computer architecture diagram that illustrates various components of a computer that provides an illustrative operating environment for the disclosure provided herein.

Methods, systems, apparatuses, and computer-readable media are provided herein for updating the system management information of a computer system. In the following detailed description, references are made to the accompanying drawings that form a part hereof, and in which are shown by way of illustration specific embodiments or examples. Referring now to the drawings, in which like numerals represent like elements throughout the several figures, aspects of the various implementations provided herein and an exemplary operating environment will be described.

FIG. 1 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments presented herein will be described. It should be appreciated that although the embodiments described herein are discussed in the context of a conventional desktop or server computer, virtually any type of computing device may be utilized. FIG. 1 shows an illustrative computer architecture for a computer 100 that is operative to update its system management information at runtime as described herein.

In order to provide the functionality described herein, the computer 100 includes a baseboard, or "motherboard", which is a printed circuit board to which a multitude of components or devices may be connected by way of a system bus or other electrical communication path. In one illustrative embodiment, a CPU 102 operates in conjunction with a chipset 104. The CPU 102 is a standard central processor that performs arithmetic and logical operations necessary for the operation of the computer. The computer 100 may include a multitude of CPUs 102.

The chipset 104 includes a north bridge 106 and a south bridge 108. The north bridge 106 provides an interface between the CPU 102 and the remainder of the computer 100. The north bridge 106 also provides an interface to a random access memory ("RAM") used as the main memory 114 in the computer 100 and, possibly, to an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a BIOS boot system compliant SCSI host bus adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("SATA") adapter for providing one or more serial ATA ports 120 and an ATA 100 adapter for providing one or more ATA100 ports 122. The serial ATA ports 120 and the ATA100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software, or other runtime environment, and uses computer resources to perform application specific tasks desired by the user. As will be described in greater detail below, an application is provided herein that stores system management information updates in the firmware 136 stored in the NVRAM 137.

The mass storage devices connected to the south bridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a NVRAM 137 for storing the firmware 136 that includes program code containing the basic routines that help to start up the computer 100 and to transfer information between elements within the computer 100. The Extensible Firmware Interface ("EFI") firmware 136 comprises a firmware that is compatible with the EFI specification. It should be appreciated that although the embodiments described herein are discussed in the context of a computing system that utilizes an EFI-compatible firmware, other types of firmware may be utilized. For instance, the firmware may comprise a Basic Input and Output System ("BIOS") firmware or other type of firmware known to those in the art. Additional details regarding the operation of the EFI firmware 136 are provided below with respect to FIGS. 2-3.

The LPC interface may also be utilized to connect a NVRAM 137 to the computer 100. The NVRAM 137 may be utilized by the firmware 136 to store configuration data and other kinds of data for the computer 100. In particular, as will be described in greater detail below, the NVRAM 137 may be utilized to store system management information for use by the computer system 100. Updates to the system management information may also be stored in the NVRAM 137 and utilized by the computer 100 at execution time. The updates may also be stored in the main memory 114 or on a mass storage device. Additional details regarding this process will be provided below with respect to FIGS. 4-8. It should be appreciated that the configuration and other data for the computer 100 may be stored on the same NVRAM device as the firmware 136.

According to one implementation, the CPU 102 comprises a general purpose microprocessor from INTEL CORPORATION. For instance, the CPU 102 may comprise a PENTIUM 4 or XEON microprocessor from INTEL CORPORATION. As known to those skilled in the art, such microprocessors support a system management mode ("SMM"). The SMM executes code in the firmware 136 to provide an alternative operating environment that can be used to monitor and manage various system resources for more efficient energy usage, to control system hardware, and/or to run proprietary code. The SMM computing mode was introduced by the INTEL CORPORATION in the 386SL processor. The SMM computing mode is also available in the PENTIUM 4, XEON, P6 family, and PENTIUM processors. SMM is also available in compatible microprocessors from other manufacturers.

SMM is a special-purpose operating mode for handling system-wide functions like power management, system hardware control, or proprietary OEM-designed code. It is generally intended only for use by system firmware, not by applications software or general-purpose system software. The main benefit of SMM is that it offers a distinct and easily isolated processor environment that operates transparently to the operating system or executive and software applications.

When SMM is invoked through a system management interrupt ("SMI"), the current state of the processor (the processor's context) is saved. The CPU 102 then switches to a separate operating environment contained in a special portion of the main memory 114 called the system management RAM ("SMRAM"). While in SMM, the CPU 102 executes SMI handler code to handle the SMI interrupt. When the SMI handler has completed its operations, it executes a resume ("RSM") instruction. This instruction causes the saved context of the processor to be reloaded, causes the to processor to switch back to executing in protected or real mode, and to resume executing the interrupted application or operating-system program or task.

The execution of the SMM computing mode is transparent to applications and operating systems. This transparency is guaranteed because the only way to enter SMM is by means of an SMI, because the processor executes SMM code in a separate address space (the SMRAM) that can be made inaccessible from the other operating modes, because the processor saves the context of the interrupted program upon entering SMM, because all interrupts normally handled by the operating system are disabled upon entry into SMM, and because the RSM instruction can only be executed in SMM. Additional details regarding the operation of the SMM computing mode are provided in documentation available from INTEL CORPORATION and are well known to those skilled in the art. It should also be appreciated that the CPU 102 has other distinct execution modes, such as the real mode and the protected mode.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
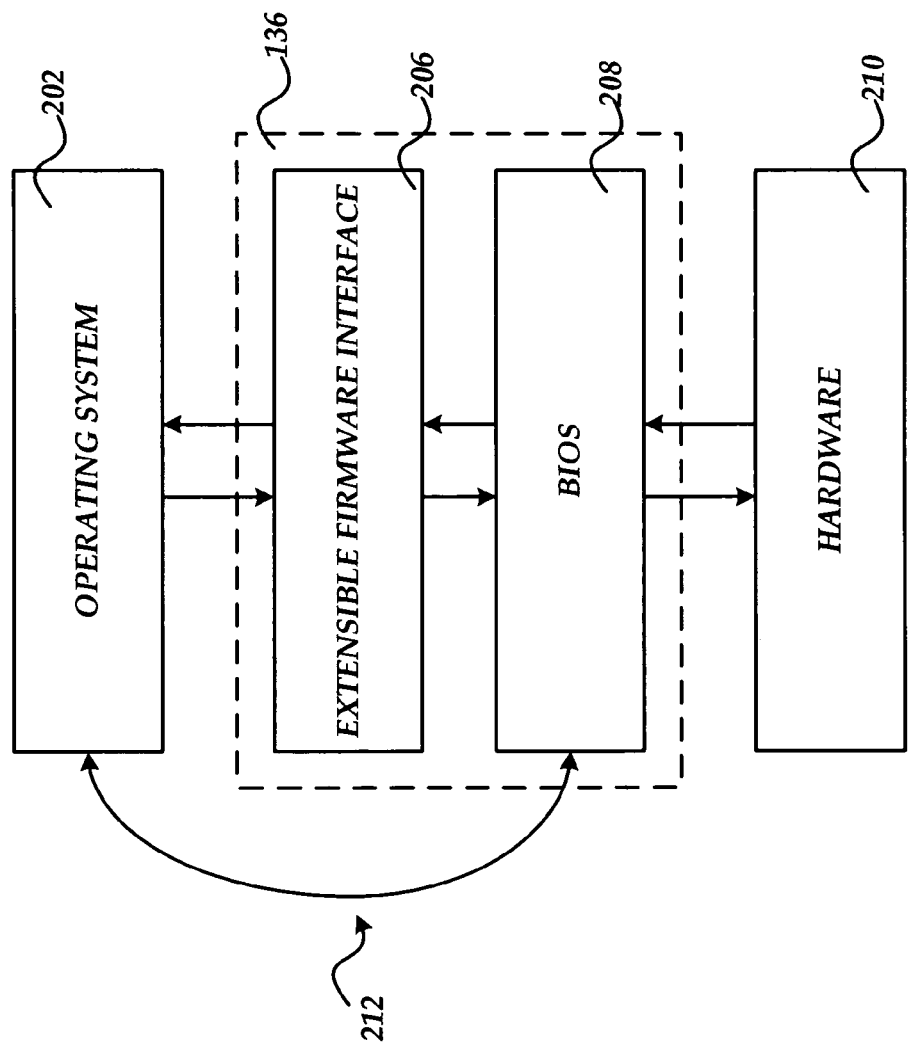
FIGS. 2 and 3 are computer architecture diagrams that illustrate aspects of an EFI environment utilized by the implementations described herein.

Referring now to FIG. 2, additional details regarding the operation of the EFI firmware 136 of the computer 100 will be described. In most computing systems, low level instruction code is used as an intermediary between the hardware components of the computing system and the operating software and other high level software executing on the computing system. In some computer systems, this low-level instruction code is known as the BIOS. The BIOS provides a set of software routines that allow high-level software to interact with the hardware components of the computing system using standard calls.

Because of limitations of the BIOS in many PC-compatible computers, a new specification for creating the firmware that is responsible for booting the computer and for intermediating the communication between the operating system and the hardware has been created. The specification is called the Extensible Firmware Interface specification and is available from INTEL CORPORATION. The original EFI specification from INTEL CORPORATION is also being extended by the UNIFIED Extensible Firmware Interface Forum ("UEFI").

The EFI specification describes an interface between the operating system and the system firmware. In particular, the specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others.

As described above, the firmware 136 comprises a firmware compatible with the EFI specification from INTEL CORPORATION or from the UEFI FORUM. The EFI specification describes an interface between the operating system 202 and the system firmware 136. The EFI specification defines the interface that platform firmware must implement, and the interface that the operating system 202 may use in booting. How the firmware 136 implements the interface is left up to the manufacturer of the firmware. The intent of the specification is to define a way for the operating system 202 and firmware 136 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 206 and a BIOS 208 may be present in the firmware 136. The BIOS 208 may be provided in the form of a compatibility support module. This allows users and system integrators to support both firmware interfaces. In order to provide this functionality, an interface 212 may be provided for use by legacy operating systems and applications. Additional details regarding the architecture and operation of the EFI 206 are provided below with respect to FIG. 3. Moreover, additional details regarding the operation and architecture of EFI can be found in the EFI specification which is available from INTEL CORPORATION end expressly incorporated herein by reference.

EFI also provides an EFI environment that executes within the SMM mode described above. The "mini-EFI" that executes within the SMM is utilized to provide EFI-like functionality for programs executing within the SMM. Programs executing within the mini-EFI in SMM may have access to the functions and data utilized by the EFI 206.

Figure 3:
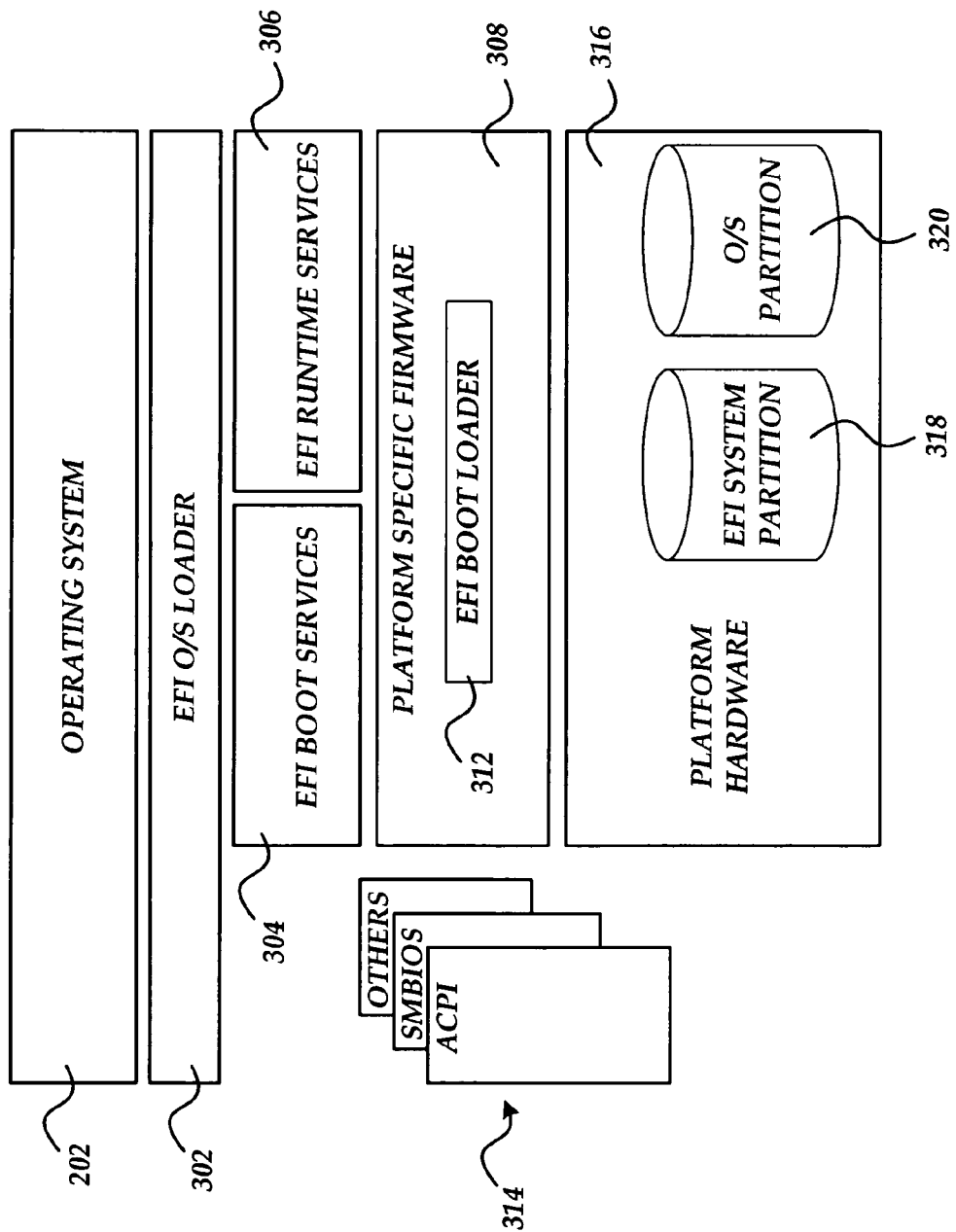

Turning now to FIG. 3, additional details regarding an EFI specification-compliant system utilized to provide an operating environment for the various implementations presented herein will be described. As shown in FIG. 3, the system includes platform hardware 316 and an operating system 202. The platform firmware 308 may retrieve an OS image from the EFI system partition 318 using an EFI O/S loader 302. The EFI system partition 318 may be an architecturally shareable system partition. As such, the EFI system partition 318 defines a partition and file system that are designed to allow safe sharing of mass storage between multiple vendors. An O/S partition 320 may also be utilized.

Once started, the EFI O/S loader 302 continues to boot the complete operating system 202. In doing so, the EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order. It should be appreciated that both the operating system 202 and the EFI firmware may provide a runtime environment for application programs as described herein.

As discussed briefly above, the EFI may operate in conjunction with an interface from the SMBIOS specification. The SMBIOS specification addresses how motherboard and system vendors present management information about their products in a standard format. The information is intended to allow generic instrumentation to deliver this information to management applications, thereby eliminating the need for error prone operations like probing system hardware for presence detection. In particular, the SMBIOS provides management information in the form of a SMBIOS structure table that is exposed to the operating system 202 and applications. The SMBIOS structure table is created in the main memory 114 from a base set of management data for the hardware stored in the NVRAM 137. For instance, the SMBIOS structure table may be created when the computer performs its power-on self test ("POST"). The SMBIOS structure table is also created using data from EFI or BIOS drivers. Once the SMBIOS structure table has been created in the memory 114, it is exposed to the operating system 202 and applications.

The SMBIOS structure table may be accessed using a table-based method or through Plug-and-Play functions. In particular, a SMBIOS structure table entry point allows access to the SMBIOS structures through 32-bit protected-mode operating systems, such as MICROSOFT WINDOWS NT. In this manner, access can be had to the table directly. Information in the SMBIOS structure table can also be accessed through a Plug-and-Play function interface. The Plug-and-Play interface can be utilized to retrieve and modify entries in the SMBIOS structure table. Additional details regarding the operation and use of the SMBIOS can be found in the SMBIOS Reference Specification from the Distributed Management Task Force. Additional details regarding the creation of the SMBIOS structure table utilizing updated management information will be provided below with reference to FIGS. 4-8.

Figure 4:
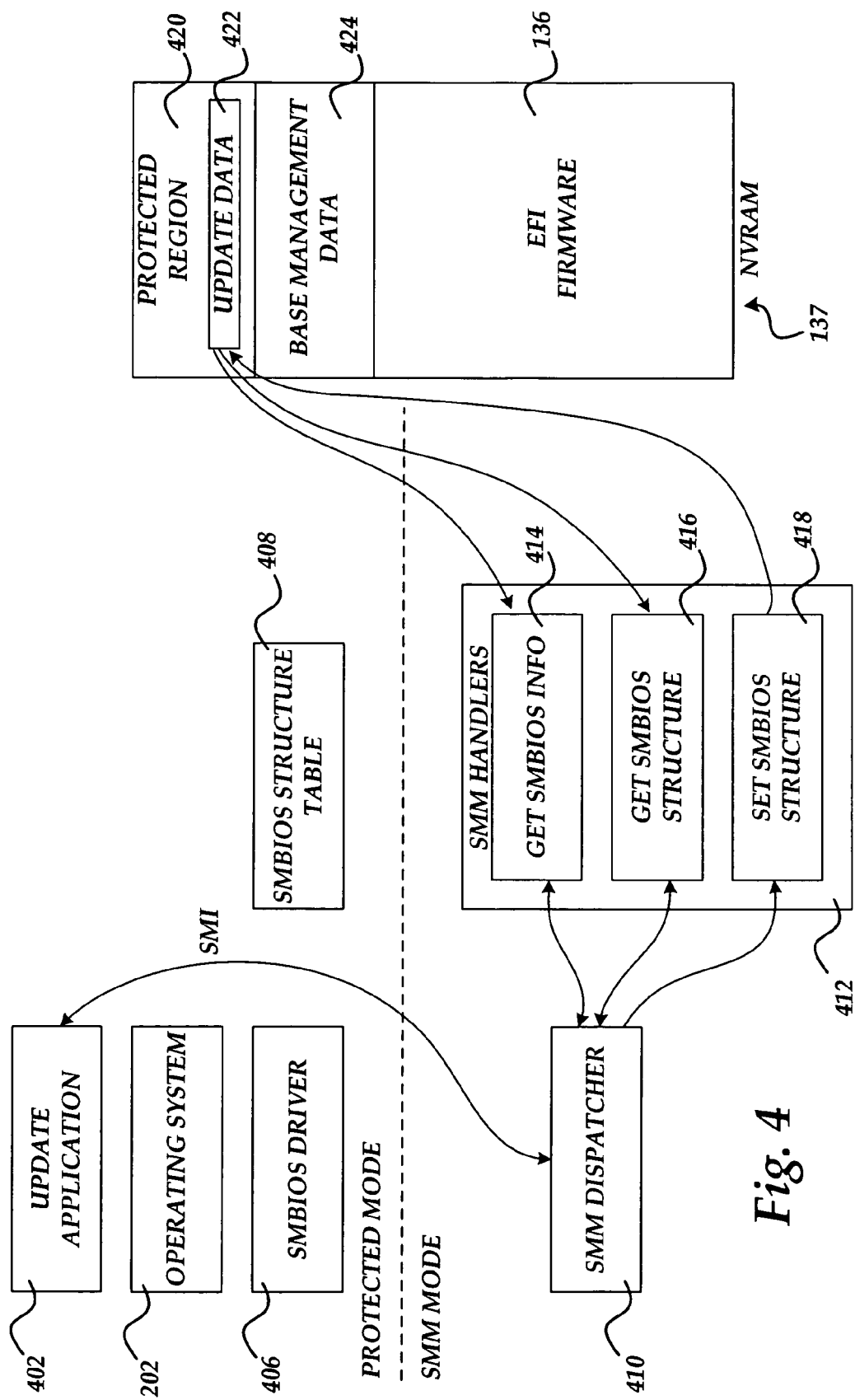
FIG. 4 is a software architecture diagram that illustrates aspects of the disclosure provided herein for storing updated system management information in a non-volatile memory device.

Referring now to FIG. 4, additional details will be provided regarding one embodiment provided herein for updating the system management data of the computer 100. As discussed briefly above, the computer 100 maintains system management data that provides information regarding the hardware of the computer 100. In one implementation, this information is provided in the form of an SMBIOS structure table 408. The SMBIOS structure table 408 is created by the SMBIOS driver 406.

The format of the SMBIOS structure table 408 is specifically defined by the SMBIOS Reference Specification, but generally includes a packed table of structures having different types. The structure types are also defined by the SMBIOS Reference Specification. Each structure type contains a number of data fields that are defined by an offset within the structure type. The SMBIOS structure table 408 is made available for use by the operating system 202 and other application programs, such as the update application 402.

As shown in FIG. 4, the NVRAM 137 stores the EFI firmware 136. The NVRAM 137 also stores a set of base management data 424. The base management data 424 contains management data regarding the hardware of the computer 100, and is utilized by the SMBIOS driver 406 to create the SMBIOS structure table 408. The base management data 424 is typically generated at manufacture time and stored in the NVRAM 137. It should be appreciated that data utilized within the SMBIOS structure table 408 may also be provided by drivers or protocols executing within the EFI firmware 136 or BIOS.

As will be described in greater detail herein, an update application 402 is provided that is operative to receive updates to the base management data 424 and to store the update data 422 in the NVRAM 137. In particular, according to one implementation, the update data 422 is stored in the protected boot block region 420 of the NVRAM 137. This protects the update data 422 from being overwritten during an update of the firmware 137. The update data 422 may also be stored in the main memory 114 or on a mass storage device.

Figure 5:
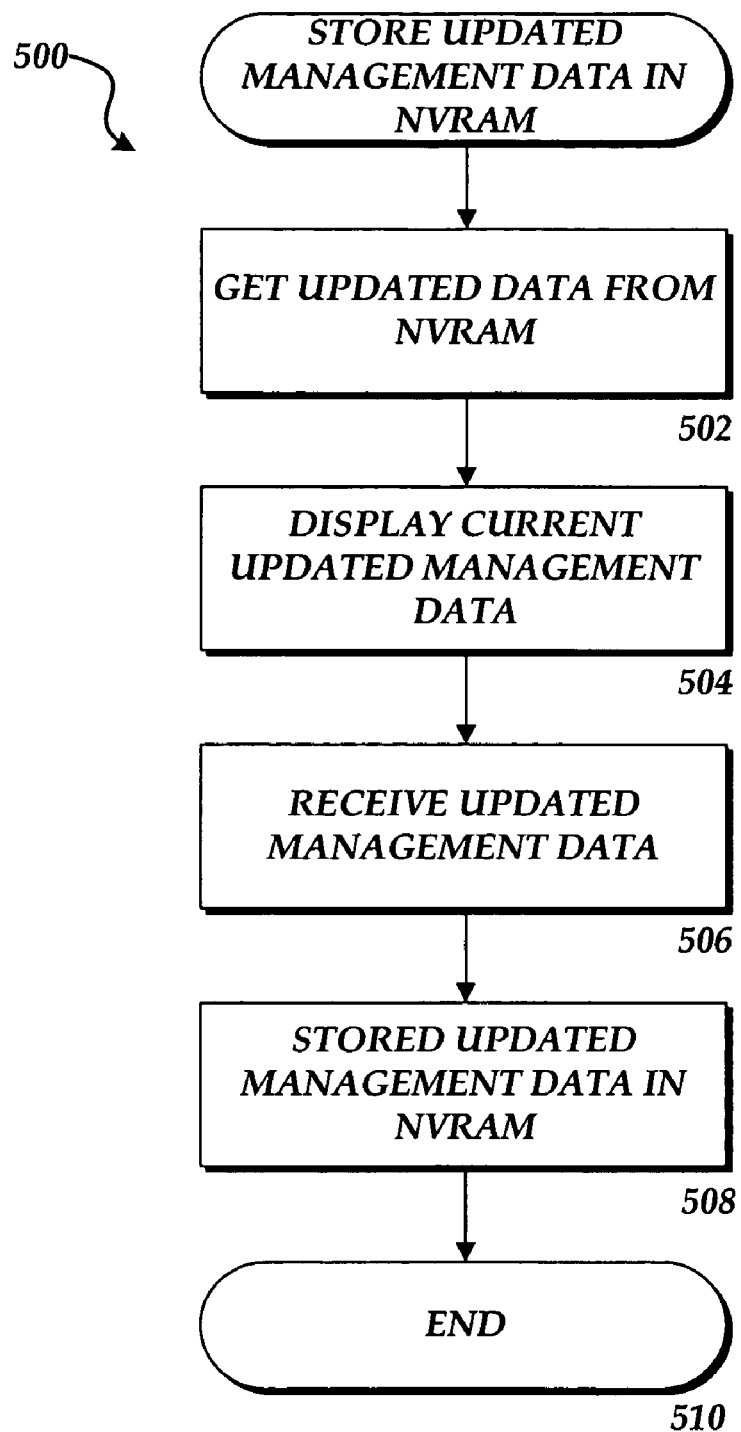
FIG. 5 is a flow diagram that illustrates aspects of a process provided herein for storing updated system management information in a non-volatile memory device.

In order to read and write the updated data 422 in the NVRAM 137, the update application 402 utilizes an SMI to invoke the SMM on the computer 100. As shown in FIG. 5, a SMM dispatcher 410 is responsible for handling the processing of an SMI, including the identification of an appropriate SMM handler for handling the generated SMI. The SMM handlers are responsible for performing the actual processing necessary to handle the interrupt.

According to one implementation, a GET SMBIOS INFO handler 414 is provided for obtaining information about the SMBIOS structures contained in the NVRAM 137. A GET SMBIOS STRUCTURE handler 416 is also provided for to retrieving the actual SMBIOS data from the NVRAM 137. A SET SMBIOS STRUCTURE 418 is also provided for updating the SMBIOS structures stored in the NVRAM. The interfaces to these structures are similar to the interfaces to the corresponding Plug-and-Play structures utilized to access the SMBIOS structure table in the memory 114.

According to implementations, the update application 402 is operative to retrieve the update data 422 from the protected boot block region 420 of the NVRAM 137 and to display the data. This is accomplished by generating an SMI, and calling the GET SMBIOS INFO handler 414 and the GET SMBIOS STRUCTURE handler 416. The update application 402 is also operative to receive modifications to the data from a user. In response, the update application 402 is operative to write the updated management information to the update data 422 using the SET SMBIOS STRUCTURE handler 418. As will be described in greater detail below, the SMBIOS driver 406 is operative to retrieve and utilize the update data 422 when creating the SMBIOS structure table 408. Additional details regarding the operation of the update application 402 are provided below with respect to FIG. 5.

Referring now to FIG. 5, an illustrative routine 500 will be described that illustrates a process for storing the update data 422 in the NVRAM 137. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 500 begins at operation 502, where the update application 402 retrieves the update data 422 from the NVRAM 137 using the GET SMBIOS INFO and GET SMBIOS STRUCTURE handlers 414 and 416, respectively. The routine 500 then continues to operation 504, where the update application 402 displays the current contents of the update data 422. At operation 506, the update application 402 receives updates to the management data from a user. The routine 500 then continues to operation 508, where the updates received from the user are written to the update data 422 using the SET SMBIOS STRUCTURE handler 418. From operation 508, the routine 500 continues to operation 510, where it ends.

Figure 6:
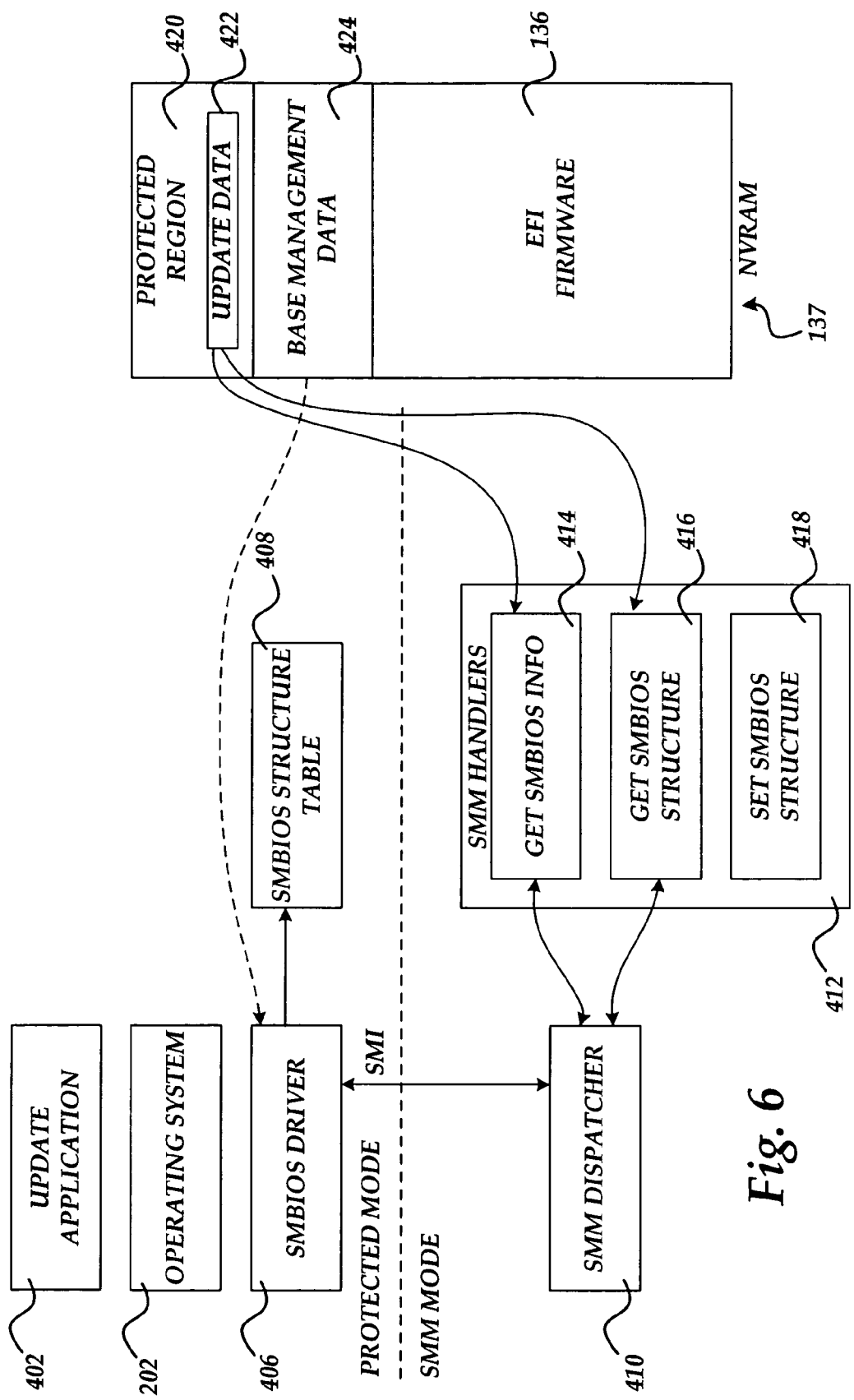
FIG. 6 is a software architecture diagram that illustrates aspects of the disclosure provided herein for updating the system management information of a computer system.
Figure 7:
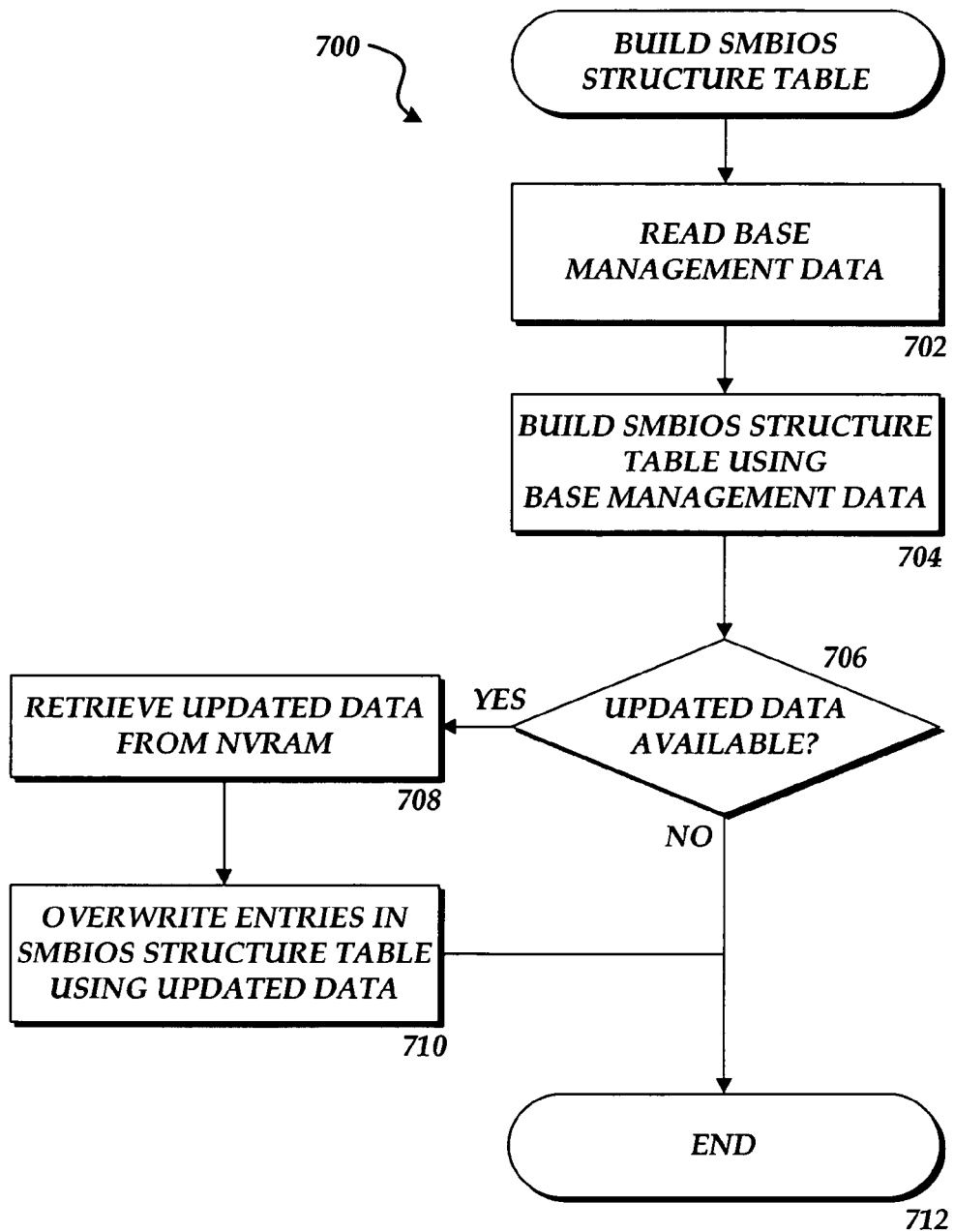
FIG. 7 is a flow diagram that illustrates aspects of a process provided herein for updating the system information of a computer system.

Referring now to FIG. 6, an aspect of one embodiment for updating the SMBIOS structure table 408 will be described. As discussed briefly above, the SMBIOS driver 406 builds the SMBIOS structure table 408. According to embodiments, the SMBIOS driver 406 is operative to generate the SMBIOS structure table 408 using the base management data 424 stored in the firmware 137. Additionally, the SMBIOS driver 406 is further operative to retrieve the update data 422 from the NVRAM 137 using an SMI and the GET SMBIOS INFO handler 414 and the GET SMBIOS STRUCTURE handler 416. The updated management data is then used to overwrite the appropriate entries in the SMBIOS structure table 408. Alternatively, the SMBIOS driver 406 may create the SMBIOS structure table 408 using both the base data 424 and the update data 422. In this manner, the update data 422 is utilized as part of the SMBIOS structure table 408 rather than the base management data 424. Turning now to FIG. 7, an illustrative routine 700 will be described further illustrating the operation of the SMBIOS driver 406. The routine 700 begins at operation 702, where the SMBIOS driver 406 reads the base management data 424 from the NVRAM 137. The SMBIOS driver 406 then begins building the SMBIOS structure table 408 using the management data contained in the base management data 424. This occurs at operation 704.

From operation 704, the routine 700 continues to operation 706, where the SMBIOS driver 406 determines whether updated management data has been stored in the protected boot block portion of the NVRAM 137. If so, the routine 700 branches from operation 706 to operation 708. Otherwise, the routine 700 continues to operation 712, where it ends.

At operation 708, the SMBIOS driver 406 retrieves the update data 422 from the NVRAM 137. The routine 700 then continues to operation 710, where the update data 422 is utilized to overwrite the appropriate portions of the SMBIOS structure table 408, thereby updating its contents. As will be described in greater detail below with respect to FIG. 8, a data structure is provided herein for storing the update data 422. The data structure also provides data defining the exact location within the SMBIOS structure table 408 for the management data. From operation 710, the routine 700 continues to operation 712, where it ends.

According to one implementation, a determination is made as to whether the particular structure table and field to be update is supported. If they are not supported, an error is returned. If the table and field to be updated are supported, the update data 422 is searched to locate the last data record of the table and field to be updated. If the update is indicated as being only a write once update, and the record already exists, an error is returned. If not, a determination is made as to where space exists for the update. If not, an attempt is made to compact the data area by removing previous updates. If space becomes available, then the update is made and success is returned. If space is not available, an error is returned.

Figure 8:
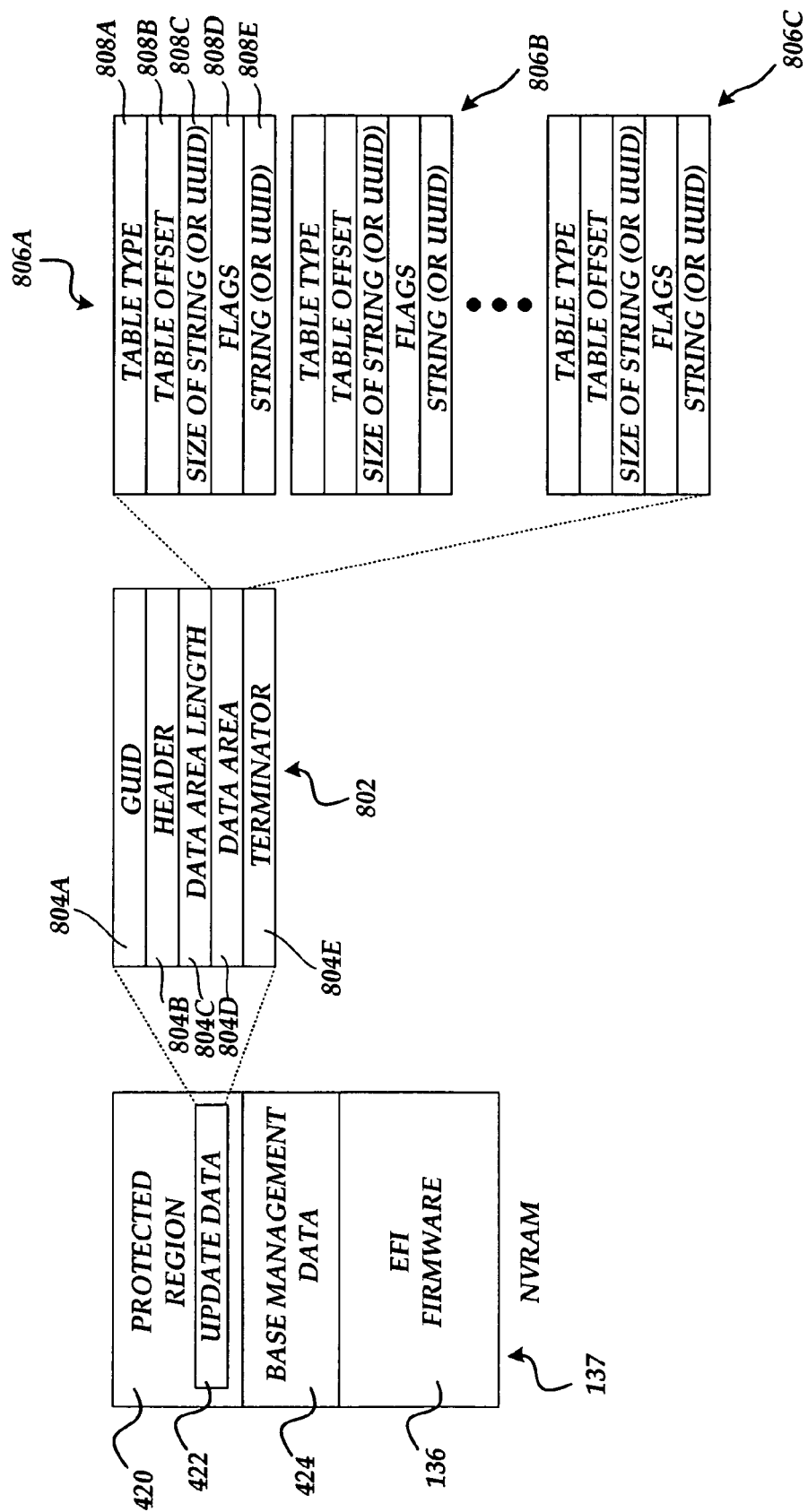
FIG. 8 is a data structure diagram illustrating a data structure provided herein for storing updated system management information.

Referring now to FIG. 8, an illustrative management information update data structure 802 will be described for storing the update data 422. In particular, the data structure 802 includes a data field 804A for storing a globally unique identifier ("GUID") that uniquely identifies the data structure 802. A data field 804B is also provided for storing a header. A data field 804C is provided for storing data that describes the length of a data field 804D that is utilized to store the updated management information. A data field 804E is also provided for storing a terminator that signifies the end of the data structure 802.

According to one implementation, the area of the flash utilized to store the update data is initially an empty area of the flash device. The empty area consists of '0xff' followed by a terminator of '0xffffffff.' When reading the data area for update records, the area is read until a value of '0xffffffff' is read. This value indicates that the last record has been read. This may be in the empty data area or the terminator.

As discussed briefly above, the data field 804D is the actual data area that is utilized to store the updated management information. The data field 804D is itself a data structure that includes not only the updated management information, but also information that describes the exact location within the SMBIOS structure table 408 where the updated management data should reside. In particular, the data field 804D includes one or more structures 806, each having the same format.

For instance, the structure 806A includes a field 808A for storing data identifying the table type within the SMBIOS structure table where the updated management data should be placed. A field 808B is utilized to store data identifying the offset within the table identified by the data in the field 808A. A field 808C is utilized to store data indicating the actual size of the string that is utilized to update the management data (stored in the field 808E). A field 808D is utilized to store a flag that indicates whether the updated field may be updated only once or multiple times. A field 808E is utilized to store the actual string for updating the management data in the location of the SMBIOS structure table 408 identified by the data in the fields 808A and 808B. In this manner, the data structure 802 provides not only the updated management data but also indicates the location within the SMBIOS structure table 408 where the data should be placed. It should be appreciated that any number of the structures 806 may be included in the data field 804D.

Based on the foregoing, it should be appreciated that embodiments described herein provide methods, systems, apparatuses, and computer-readable media for updating the system management data of a computer system. Moreover, although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for updating system management data of a computer system, the method comprising:
   storing, at a protected region of a non-volatile memory of the computer system, an update to a base set of management information;
   during the execution of the computer system, building a system management information table from the base set of management information and the update to the base set of management information, wherein building the system management information table comprises executing an update application configured to use a system management interrupt (SMI) to invoke a system management mode (SMM) at the computer system, wherein the update application is operative to retrieve the update to the base set of management information from the protected region of the non-volatile memory of the computer system, and to provide the update to the base set of management information and the base set of management information to a SMBIOS driver for building of the system management information table.

2. The method of claim 1, wherein storing the update comprises storing the update to the base set of management information at a protected boot block of the non-volatile memory.

3. The method of claim 2, wherein the base set of management information is stored in a non-protected region of the non-volatile memory.

4. The method of claim 3, wherein building the system management information table comprises generating the system management information table using the base set of management information and overwriting any entries in the system management information table that are identified in the updates to the base set of management information.

5. The method of claim 4, wherein the updates to the base set of management information are read from the non-volatile memory using the SMI.

6. The method of claim 5, wherein:
   the update application is further configured to receive the update to the base set of management information; and
   storing the update comprises storing, using the update application, the update in the protected region of the non-volatile memory device using the SMI.

7. A computer-readable storage medium having computer-executable instructions stored thereon which, when executed by a computer, cause the computer to perform the method of claim 1.

8. A computer-controlled apparatus capable of performing the method of claim 1.

9. A method for updating system management data during the runtime of a computer system, the method comprising:
    storing a base set of management information in a first area of a non-volatile memory;
    storing an update to the base set of management information in a second area of the non-volatile memory; and
    during the execution of the computer system, building a system management information table from the base set of management information and the update to the base set of management information, wherein building the system management information table comprises an update application using a system management interrupt (SMI) to invoke a system management mode (SMM) at the computer system, wherein the update application is operative to retrieve the base set of management information from the first area of the non-volatile memory, to retrieve the update to the base set of management information from the second area of the non-volatile memory, and to provide the update to the base set of management information and the base set of management information to a SMBIOS driver for building of the system management information table.

10. The method of claim 9, wherein the system management information table comprises a system management basic input/output system (SMBIOS) structure table.

11. The method of claim 10, wherein the second area of the non-volatile memory comprises a protected boot block of the non-volatile memory.

12. The method of claim 11, wherein retrieving the update to the base set of management information from the first area comprises retrieving the update from the protected boot block of the non-volatile memory using the SMI.

13. The method of claim 12, wherein the update application is further operative to modify the update to the base set of management information by:
    receiving one or more updates to the base set of management information, and
    writing the one or more updates to the protected boot block of the non-volatile memory.

14. The method of claim 13, wherein the update application is further operative to write the one or more updates to the protected boot block using the SMI.

15. A computer-readable storage medium having computer-executable instructions stored thereon which, when executed by a computer, cause the computer to perform the method of claim 9.

16. A computer-controlled apparatus capable of performing the method of claim 9.

17. A memory for storing data for updating management information of a computer system during the runtime of the computer system, the memory comprising:
    a management information update data structure stored in the memory, the data structure including a globally unique identifier ("GUID") field for storing data that uniquely identifies the management information update data structure, a length field for storing data identifying the length of a data area, and a data area for storing the data for updating the management information of the computer system during the runtime of the computer system, wherein the data area comprises:
    a first data field configured to store data identifying a table type within a system management information table;
    a second data field configured to store data identifying an offset within the table type identified by the data stored in the first field; and
    a third field configured to store data for updating the contents of the system management information table at the location specified by the data stored in the first data field and the second data field.

18. The memory of claim 17, wherein the system management information table comprises a system management basic input/output system (SMBIOS) structure table.

* * * * *